US009268561B1

(12) United States Patent
Srinivasa et al.

(10) Patent No.: US 9,268,561 B1
(45) Date of Patent: Feb. 23, 2016

(54) FEDERATED SERVICES TO DYNAMICALLY SWITCH FEATURES IN APPLICATIONS

(71) Applicants: Varadarajan Chakravarthy Srinivasa, Bangalore (IN); Harihara Subramanian, Bangalore (IN); Shankar Karthik, Bangalore (IN)

(72) Inventors: Varadarajan Chakravarthy Srinivasa, Bangalore (IN); Harihara Subramanian, Bangalore (IN); Shankar Karthik, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/565,623

(22) Filed: Dec. 10, 2014

(51) Int. Cl.
*G06F 9/44* (2006.01)
*G06F 9/445* (2006.01)

(52) U.S. Cl.
CPC ... *G06F 8/71* (2013.01); *G06F 8/60* (2013.01)

(58) Field of Classification Search
CPC ................................ G06F 8/60; G06F 8/71
USPC .................. 717/120–123, 168–178
See application file for complete search history.

(56) References Cited

U.S. PATENT DOCUMENTS

| 8,656,353 | B2* | 2/2014 | Brendza et al. | 717/109 |
| 2007/0240220 | A1* | 10/2007 | Tuvell et al. | 726/24 |
| 2010/0262959 | A1* | 10/2010 | Bruno et al. | 717/171 |
| 2013/0239086 | A1* | 9/2013 | Brendza et al. | 717/109 |
| 2014/0228014 | A1* | 8/2014 | Tervo et al. | 455/419 |

* cited by examiner

*Primary Examiner* — Qing Chen (57) ABSTRACT

An application binary is received at an intermediate federated service layer before deployment of the application binary at the application store. At the intermediate federated service layer multiple copies of application binaries are generated concurrently. At the intermediate service layer, program code of the copies of application binaries is concurrently parsed and features of copies of application binaries are matched with features of operating system. If the features match, corresponding program codes are flagged to switch off, and re-generated as custom application binary and deployed in application store. The custom application binary and a container along with features corresponding to operating system of a mobile device are downloaded to a mobile device. A request to access a set of features is received from the custom application binary at the container. If the set of features match the features of the operating system request is allowed through the container else it's blocked.

23 Claims, 7 Drawing Sheets

FEDERATED SERVICES TO DYNAMICALLY SWITCH FEATURES IN APPLICATIONS

BACKGROUND

Mobile applications are developed to execute on different kinds of client devices such as mobile phones, electronic tablets, portable computers, etc. Typically, the mobile applications are developed for specific versions of operating system or platform. The development effort is directly proportional to the number of versions of operating systems. If an application is developed for a latest version of an operating system, the application may support or be compatible with one or more earlier versions of the operating system, however, for the application to be compatible with a complete set of earlier versions of the operating systems, the application may have to be developed for the individual earlier versions of the operating systems. It is challenging to develop an operating system version agnostic application that is compatible across operating systems versions or platforms.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. Various embodiments, together with their advantages, may be best understood from the following detailed description taken in conjunction with the accompanying drawings.

DETAILED DESCRIPTION

Embodiments of techniques for federated services to dynamically switch features in applications are described herein. In the following description, numerous specific details are set forth to provide a thorough understanding of the embodiments. A person of ordinary skill in the relevant art will recognize, however, that the embodiments can be practiced without one or more of the specific details, or with other methods, components, materials, etc. In some instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
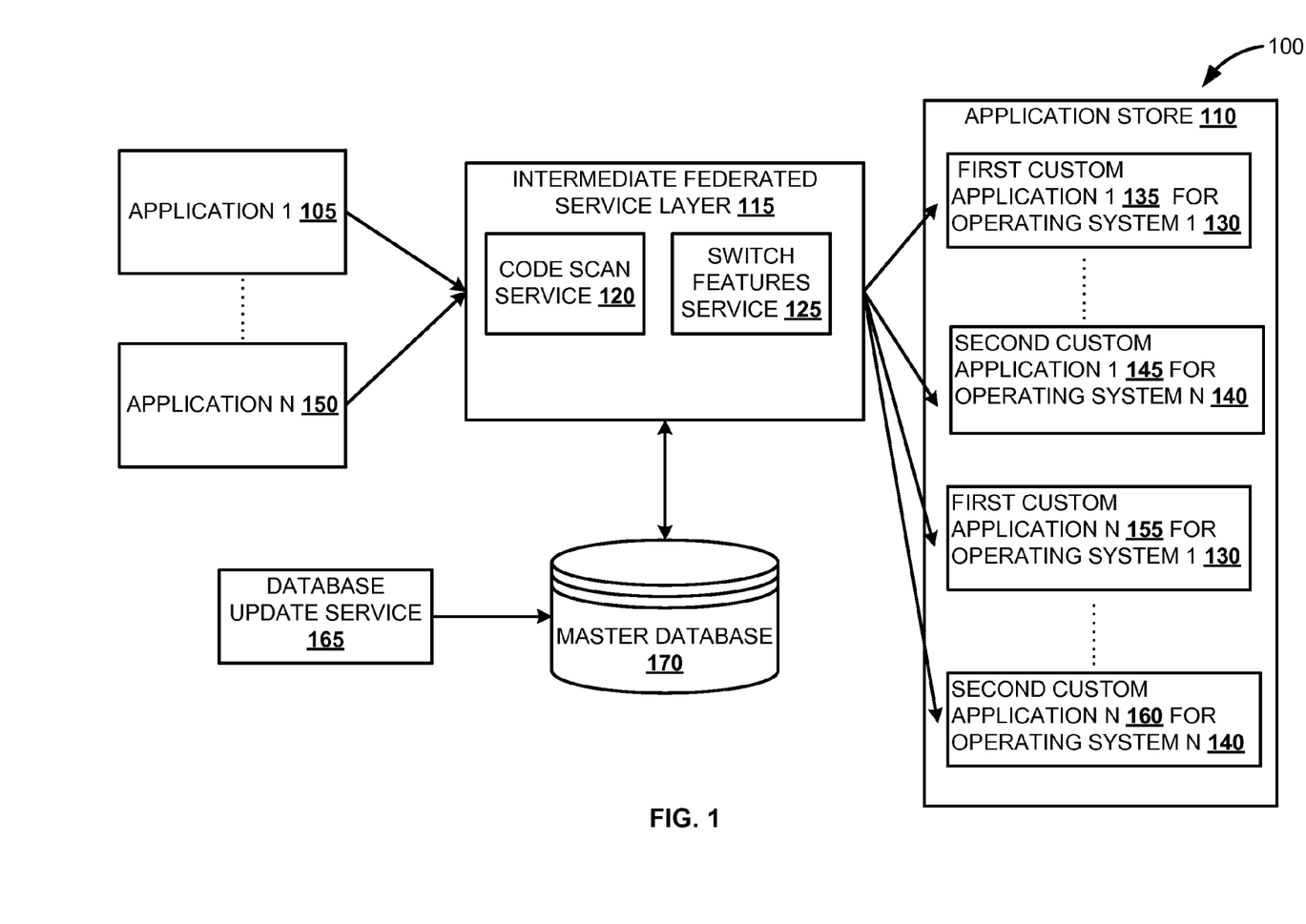
FIG. 1 is a block diagram illustrating a deployment environment for federated service to dynamically switch features in applications, according to one embodiment.

FIG. 1 is a block diagram illustrating deployment environment 100 for federated service to dynamically switch features in applications, according to one embodiment. Applications also referred to as 'apps' are deployed in application stores also referred to as 'app stores'. Consider a scenario where an application 'application 1' 105 is to be deployed in application store 110. 'Application 1' 105 is in the form of an application binary or application binary package that may include an executable form of compiled program code of the application, images, sounds, compressed versions of other files, etc. One example of application binary is Android application package (APK) that is packaged to include compiled program code of an application, icons, certificates, etc. The 'application 1' 105 binary is received at an intermediate federated service layer 115 prior to deployment at the application store 110. At the intermediate federated service layer 115, multiple copies of the 'application 1' 105 binary corresponding to various versions of operating systems are generated concurrently. Code scan service 120 in the intermediate federated service layer 115 concurrently parses or scans the compiled program code in the copies of individual 'application 1' binary. The compiled program code referred to as program code in the 'application 1' binary may have various functions or functionalities, where the individual functions may perform specific task or tasks.

For example, displaying direction in a digital map may be a function. An individual function in the 'application 1' 105 may correspond to a feature or a number of features. The features may be hardware-based such as a magnetometer sensor, software-based such as application widgets, based on the version of operating system, etc. For example, the displaying direction in a digital map function may correspond to a feature of accessing or reading data to and from a magnetometer sensor available in a client device such as a mobile device, where the magnetometer sensor is used to identify cardinal directions.

Various techniques of parsing the program code for features and/or functionalities may be used. One such technique is static analysis, where the program code is scanned line by line, and keywords corresponding to features are used to identify features in the program code. For example, various keywords such as sensor type magnetic field, magnetic field calibrated, magnetic north, etc., can be used to identify the feature magnetometer sensor in the program code of 'application 1' 105 binary. 'Application 1' 105 may be a three dimension compass application that uses data from the underlying magnetometer sensor in the mobile device. Similarly, 'application 1' 105 may use various other features such as gyroscope sensor, microphone, speaker, etc., of the mobile device to execute the application effectively.

'Application 1' 105 binary may be deployed in application store 110 corresponding to various versions of operating systems. The various versions of operating systems may include major versions such as major version increments like 'version 1.0', 'version 2.0', etc., and minor versions such as minor version increments like 'version 1.1', 'version 1.2', etc. The various versions of operating systems may also include operating systems from various vendors and platforms such as Android®, iOS®, Microsoft Windows®, BlackBerry®, etc.

Individual versions of the operating systems support certain sets of features, for example, versions of operating systems such as Android 4.0 and Android 2.3 support gyroscope sensor whereas, the versions of operating systems Android 2.2 and Android 1.5 do not support gyroscope sensor.

While the code scan service 120 in the intermediate federated service layer 115 concurrently parses or scans the program code in the individual copies of the 'application 1' binary, switch features service 125 in the intermediate federated service layer 115 compares the features of copies of the 'application 1' binary with features of the corresponding versions of operating systems. A custom switch in the form of a label or flag may be injected and defined with two states, 'ON' and 'OFF', in the copies of the 'application 1' binary. The injection or code injection of a custom switch may use any form of custom code injection techniques. Code may also be injected to perform other functions such as add a missing function call, exception handling, etc. When the features of the copies of the 'application 1' binary do not match with features of the corresponding versions of operating systems, switch features service 125, identifies portions of program code in functions corresponding to the features not matched. Switch flags are injected and sets to 'OFF' at the start of identified portions of program code in the copies of the 'application 1' binary, to disable the features that are not matched. Setting the switch flags to 'OFF' indicates disabling the portions of program code in the copies of the 'application 1' binary that are not matched or not supported by the corresponding versions of operating systems. Disabled portions of program code remains unexecuted until enabled again by setting the switch flags to 'ON'.

When the features of copies of the 'application 1' binary match with features of the corresponding versions of operating systems, switch features service 125, identifies portions of program code in functions corresponding to the matched features. Switch flags are injected and set to 'ON' at the start of the identified portions of program code in the copies of the 'application 1' binary that are matched or supported by the corresponding versions of operating systems. Setting the switch flags to 'ON' indicate enabling the portions of program code in the copies of 'application 1' binaries. In some cases the portions of program code are enabled by default and setting the switch flags to 'ON' may be optional. The portions of program code that are enabled are executed in the copies of the 'application 1' binary. After the switch features service 125 sets the switch flags to 'ON' and 'OFF' in the copies of the 'application 1' binary, they are re-generated as custom application binaries that are compliant or compatible with the corresponding versions of operating systems. For example, a copy of 'application 1' 105 binary is re-generated as a 'first custom application 1' 135 binary that is compliant or compatible with the 'operating system 1' 130 version. The 'first custom application 1' 135 binary is automatically deployed in the application store 110 corresponding to 'operating system 1' 130 version.

Similarly, another copy of 'application 1' 105 binary is re-generated as 'second custom application 1' 145 binary that is compliant/compatible with the 'operating system N' 140 version. The 'second custom application 1' 145 binary is automatically deployed in the application store 110 corresponding to version 'operating system N' 140. Similarly, 'application N' 150 can be automatically deployed as a 'first custom application N' 155 corresponding to 'operating system 1' 130 and can be automatically deployed as a 'second custom application N' 160 corresponding to 'operating system N' 140.

In one embodiment, a new application binary may be developed for a latest version of operating system, and using intermediate federated service layer 115, the new application binary can be deployed in corresponding lower versions of operating systems. While the code scan service 120 concurrently parses or scans the program code of copies of the new application binary, switch features service 125, compares the features of the copies of the new application binary with the features of corresponding lower versions of operating systems. When the features in the copies of the new application binary do not match with features of the corresponding lower versions of operating systems, switch features service 125 identifies portions of program code in functions corresponding to the features not matched. Switch flags are injected and set to 'OFF' at the start of the identified portions of program code in the copies of the new application binary. The copies of the new application binary is re-generated as new custom application binaries that are compliant/compatible with lower versions of operating systems and deployed in the application store 110.

In one embodiment, a new application binary may be developed with future enhancements features but the future enhancements features may be disabled in a specific version of the new application binary. Using intermediate federated service layer 115 the new application binary can be deployed in corresponding versions of operating systems. While the code scan service 120 concurrently parses or scans the program code of copies of the new application binary, switch features service 125 in the intermediate federated service layer 115, compares the disabled future enhancements features with the features of corresponding versions of operating systems. When the disabled future enhancements features match with the features of the corresponding versions of operating systems, switch features service 125 identifies portions of program code in functions corresponding to disabled future enhancements features. Switch flags are injected and set to 'ON' at the start of the identified portions of program code to enable the disabled future enhancements features in the copies of the new application binary. The copies of the new application binary are re-generated as new custom application binaries that are compliant/compatible with corresponding versions of operating systems and deployed in the application store 110.

In one embodiment, a new version of application such as a major version or a minor version may be deployed corresponding to various versions of operating systems in the application store 110. For example, a new version of 'application 1' binary such as 'application 1.1' may be ready for deployment that may include updates i.e., additional features, bug fixes, etc., in comparison to the prior version of 'application 1' binary. While the code scan service 120 concurrently parses or scans the program code of copies of the 'application 1.1' binary, switch features service 125, compares the features of copies of the 'application 1.1' binary with the features of corresponding versions of operating systems. When the features of copies of the 'application 1.1' binary match the features of the corresponding versions of operating systems, switch features service 125, identifies portions of program code in functions corresponding to matched features. Switch flags are injected and set to 'ON' at the start of the identified portions of program code. When the features in the copies of 'application 1.1' binaries do not match with features of the corresponding versions of operating systems, switch features service 125 identifies portions of program code in functions corresponding to the features that are not matched. Switch flags are injected and set to 'OFF' at the start of identified portions of program code in the copies of 'application 1.1' binaries. The 'application 1.1' binaries are re-generated as custom 'application 1.1' binaries that are compliant/compatible with corresponding versions of operating systems and deployed in the application store 110.

In one embodiment, new versions of operating systems may be available. Database update service 165 may be a lookup service that looks up for new versions of operating systems release from various sources, and updates the master database 170. For example, database update service 165 may use Rich Site Summary (RSS) to subscribe to various other sites to retrieve features corresponding to new versions of operation systems as RSS feeds, and the RSS feeds are updated in the master database 170. In one embodiment, manual update of master database 170 may be used to manually enter the features corresponding to new versions of operating systems. The master database 170 has updates of different versions of operating systems and their corresponding features. When a new version of 'operating system 1' is available such as 'operating system 1.1', features corresponding to 'operating system 1.1' are updated in the master database 170. 'Application 1' 105 is to be deployed corresponding to the 'operating system 1.1' in the application store 110. Code scan service 120 is used to scan the program code corresponding to a copy of 'application 1' binary. Switch features service 125 sets switch flags to 'ON' and 'OFF' corresponding to features in the program code in the copy of 'application 1' binary supported by the 'operating system 1.1'. The copy of 'application 1' binary is re-generated as a custom 'application 1' binary that is compliant/compatible with the 'operating system 1.1' version. The custom 'application 1' binary is deployed in the application store 110 corresponding to 'operating system 1.1' version. Similarly, other applications are re-generated as custom application binaries and deployed corresponding to 'operating system 1.1' version.

Figure 2:
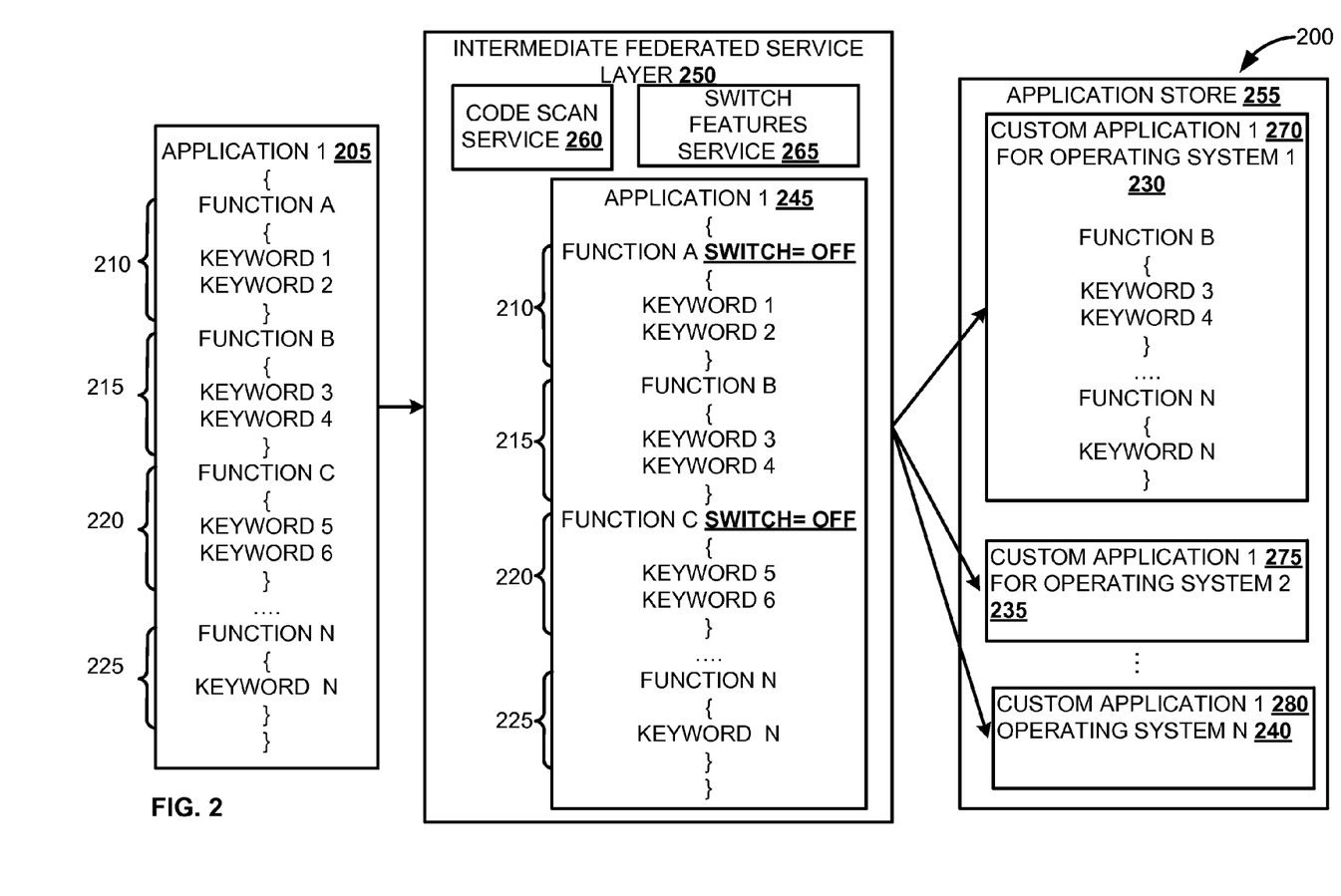
FIG. 2 is a block diagram illustrating an example in a deployment environment for federated service to dynamically switch features in applications, according to one embodiment.

FIG. 2 is a block diagram illustrating an example in deployment environment 200 for federated service to dynamically switch features in applications, according to one embodiment. The 'application 1' 205 binary has various functionalities or functions such as function A 210, function B 215, function C 220, function N 225, etc. Program code in function A 210 has various keywords such as 'keyword 1', 'keyword 2', etc., and these keywords correspond to 'feature A' supported by 'application 1' 205. Program code in function B 215 has various keywords such as 'keyword 3', 'keyword 4' etc., and these keywords correspond to 'feature B' supported by 'application 1' 205. Program code in function C 220 has various keywords such as 'keyword 5', 'keyword 6' etc., and these keywords correspond to 'feature C' supported by 'application 1' 205. Similarly, program code in function N 225 has various keywords such as 'keyword N', etc., and this keyword corresponds to 'feature N' supported by 'application 1' 205.

The 'application 1' 205 binary is to be deployed corresponding to various versions of operating systems such as 'operating system 1' 230, 'operating system 2' 235, 'operating system N' 240, etc. 'Operating system 1' 230 supports various features such as 'feature B', 'feature N', etc. The 'application 1' 245 binary is received at an intermediate federated service layer 250 prior to deployment at the application store 255. At the intermediate federated service layer 250, multiple copies of the 'application 1' binary corresponding to various versions of operating systems are generated concurrently. Code scan service 260 in the intermediate federated service layer 250 concurrently and/or consecutively parses or scans the program code in the individual copies of the 'application 1' binary. When the code scan service 260 parses the program code in a copy of the 'application 1' binary, the features supported by the copy of the 'application 1' binary such as 'feature A', 'feature B', 'feature C' and 'feature N' are compared with the features corresponding to the 'operating system 1' 230 such as 'feature B' and 'feature N'.

'Feature A' and 'feature C' of the copy of the 'application 1' binary does not match with the features of the 'operating system 1' 230, and the switch features service 265 identifies portion of program code in function A 210 and portion of program code in function C 220 and injects switch flags and sets the switch flags to 'OFF'. The copy of the 'application 1' binary is re-generated as a 'custom application 1' 270 binary. The 'custom application 1' 270 binary is deployed in the application store 255, corresponding to the 'operating system 1' 230. Similarly, 'custom application 1' 275 binary and 'custom application 1' 280 binary are concurrently re-generated, and deployed for the available version of the operating systems 'operating system 2' 235 and 'operating system N' 240 respectively in the application store 255.

Figure 3:
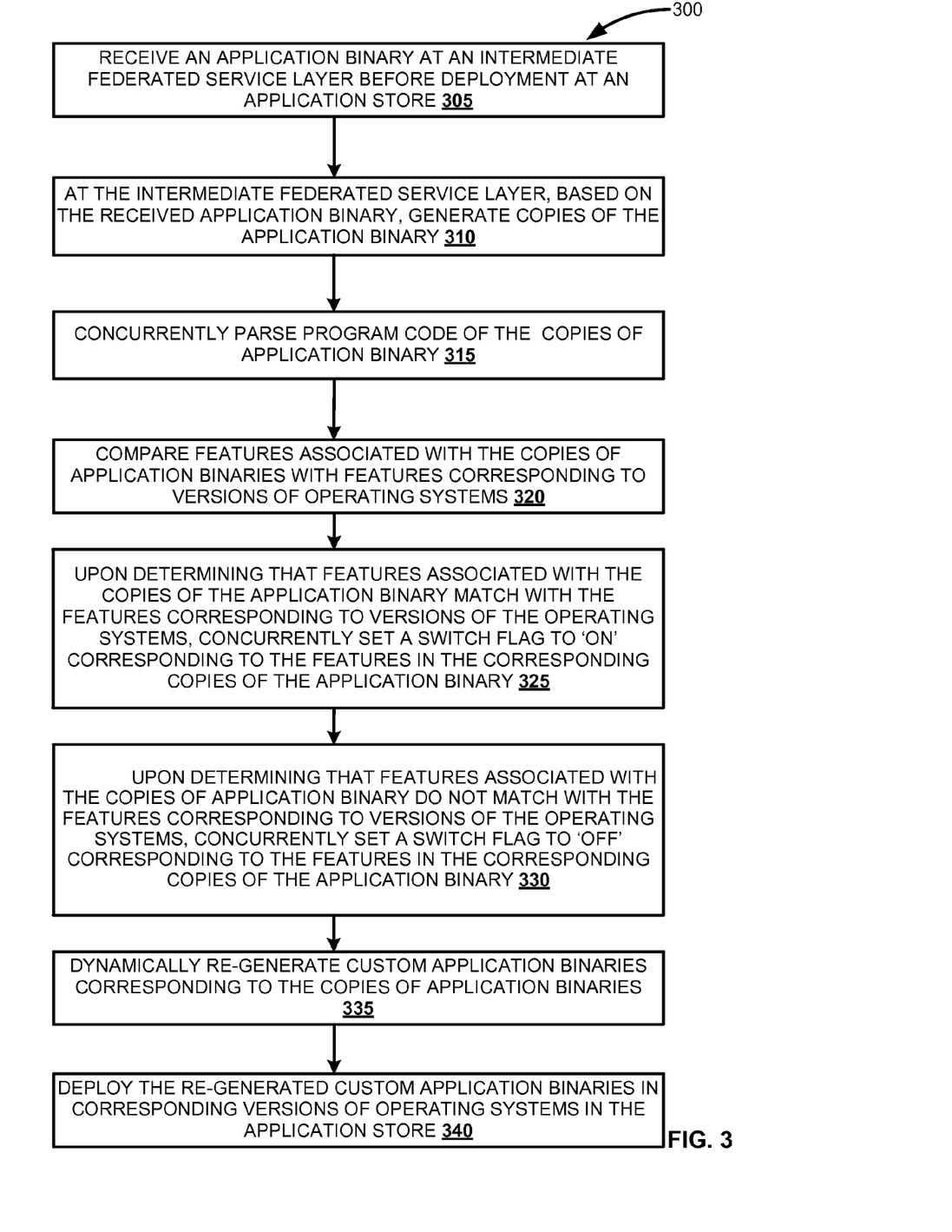
FIG. 3 is flow diagram illustrating a process for federated service to dynamically switch features in applications at deploy time, according to one embodiment.

FIG. 3 is flow diagram illustrating process 300 of federated service to dynamically switch features in applications at deploy time, according to one embodiment. At 305, an application binary is received at an intermediate federated service layer before deployment of the application binary at an application store. At the intermediate federated service layer, at 310, based on the received application binary, multiple copies of the application binary corresponding to various versions of operating systems are concurrently generated. At 315, program code of the copies of the application binary is concurrently parsed. At 320, features associated with the copies of the application binary are compared with features corresponding to versions of operating systems. Upon determining that features associated with the copies of the application binary match features corresponding to versions of the operating systems, at 325, portions of program code in functions corresponding to the matched features are identified. Switch flags are injected and concurrently set to 'ON' at the start of identified portions of program code corresponding to the features in the corresponding copies of the application binary.

Upon determining that features associated with the copies of the application binary do not match features corresponding to versions of the operating systems, at 330, portions of program code in functions corresponding to the features not matched are identified. Switch flags are injected and concurrently set to 'OFF' at the start of identified portions of program code corresponding to the features in the corresponding copies of the application binary. At 335, custom application binaries corresponding to the copies of the application binary are dynamically re-generated. At 340, the re-generated custom application binaries are automatically deployed in corresponding versions of operating systems in the application store. Process steps 310 to 335 may be performed in the intermediate federated service layer.

Figure 4:
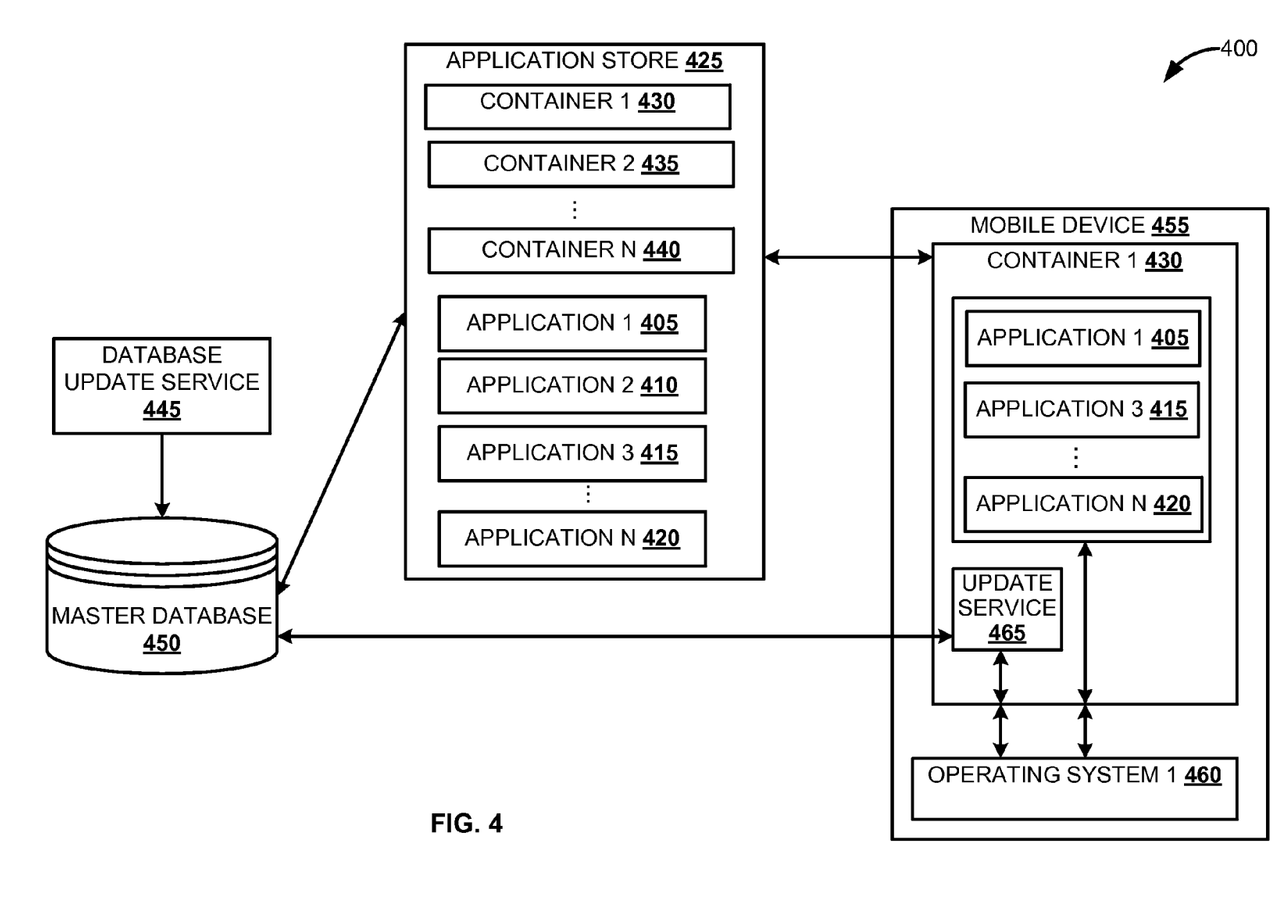
FIG. 4 is a block diagram illustrating a runtime environment for federated service to dynamically switch features in applications, according to one embodiment.

FIG. 4 is a block diagram illustrating runtime environment 400 for federated service to dynamically switch features in applications, according to one embodiment. Consider a scenario where a number of applications such as 'application 1' 405, 'application 2' 410, 'application 3' 415, 'application N' 420 are deployed in application store 425. The application store 425 also includes containers such as 'container 1' 430, 'container 2' 435, 'container N' 440 that provides a runtime execution environment for the applications to be executed on various devices. Container is an application that sandboxes or encloses other applications that may execute within the container. Various operating systems may be supported or be compatible with a corresponding operating system specific container. For example, for the Android® operating system may support a container 'container 1', iOS® operating system may support a container 'container 2', Microsoft Windows® operating system may support a container 'container 3', etc. In the scenario considered in FIG. 4, 'operating system 1' supports 'container 1' 430, 'operating system 2' supports 'container 2' 435, and 'operating system 3' supports 'container N' 440. Database update service 445 may be a lookup service that looks up for new versions of individual operating system releases from various sources or sites and updates the master database 450. The master database 450 has updates of different versions of operating systems and their corresponding features.

For example, consider a scenario where a request is received from mobile device 455 to download 'application 1' 405, 'application 3' 415 and 'application N' 420 from the application store 425. When a request is received from a client device such as a mobile device 455 to download applications from the application store 425, the application store 425 determines that 'container 1' 430 is supported by 'operating system 1' 460 executing in the mobile device 455. A notification to download and install 'container 1' 430 is displayed in the mobile device 455. The user may choose to download 'container 1' 430 and install in the mobile device 455. Alternatively, the user may choose to download and install 'container 1' 430 at a later point of time. The 'container 1' 430 is downloaded and installed once for the first time, and that may be an automatic download or a manually initiated download. Whenever 'container 1' 430 is updated to a new version, the new version of 'container 1' 430 can be updated automatically from the application store 425. The applications application 1' 405, 'application 3' 415 and 'application N' 420 along with 'container 1' 430 are downloaded to the mobile device 455 from the application store 425. The 'container 1' 430 may be downloaded in parallel with the applications application 1' 405, 'application 3' 415 and 'application N' 420, or, the applications may be downloaded immediately following the download of the 'container 1' 430. The downloaded applications are executed within the 'container 1' 430 on the mobile device 455.

The 'container 1' 430 in the application store 425 retrieves features corresponding to 'operating system 1' 460 from the master database 450. The applications, 'application 1' 405, 'application 3' 415 and 'application N' 420 execute within the 'container 1' 430 in the mobile device 455. During execution or running of the applications, the 'container 1' 430 intermediates the interactions between the applications 'application 1' 405, 'application 3' 415 and 'application N' 420 and the 'operating system 1' 460. The 'container 1' 430 handles function calls from the applications and determines whether to delegate the function calls to the 'operating system 1' 460 or not. The applications 'application 1' 405, 'application 3' 415 and 'application N' 420 may have a certain set of features and the applications may request access to corresponding set of features in the 'operating system 1' 460 via the 'container 1' 430. The 'container 1' 430 intercepts the requests received from the applications, and compares the set of features of the applications with the features corresponding to the 'operating system 1' 460. The requests may be in the form of a function call such as API call. When the set of features of the applications matches with the features of the 'operating system 1' 460, the requests to access are allowed through the 'container 1' 430 and delegated to the 'operating system 1' 460. When the set of features of the applications does not match with the features of the 'operating system 1' 460, the requests to access are not allowed through the 'container 1' 430 and the requests are blocked at the 'container 1' 430. The allowing and blocking of requests to access occurs at runtime when the applications are executing or running within the 'container 1' 430 in the mobile device 455.

In one embodiment, when the user downloads 'container 1' 430 and installs in the mobile device 455, the user may choose to set the 'container 1' 430 as a 'default container' for the applications currently installed in the mobile device 455. When the 'container 1' 430 is set as a default container, the previously installed applications and the applications that may be installed in the future may execute within 'container 1' 430 as explained above. In another embodiment, when the user may not choose to set the 'container 1' 430 as a default container, the applications installed along with the 'container 1' 430 or the applications selected by the user may execute within the 'container 1' 430. In this scenario, the applications not selected execute outside the 'container 1' 430. Individual applications can be selected and configured to execute within the 'container 1' based on a customizable 'user setting'.

In one embodiment, the 'operating system 1' 460 in the mobile device can be updated or upgraded to a newer version such as 'operating system 2.1'. The database update service 445 determines the new 'operating system 2.1' availability, and updates the master database 450 with the 'operating system 2.1' corresponding features. When the 'operating system 1' 460 is updated to 'operating system 2.1' in the mobile device 455, the update service 465 requests the master database 450 to receive updated features corresponding to 'operating system 2.1' from the master database 450. The update service 465 updates the 'container 1' 430 with updated features corresponding to 'operating system 2.1' in the mobile device 455. The 'container 1' 430 intercepts the request received from the applications, and compares the set of features of the applications with the updated features corresponding to the 'operating system 2.1'. When the set of features of the applications matches the updated features of the 'operating system 2.1', the request to access is allowed through the 'container 1' 430 to the 'operating system 2.1' at runtime. When the set of features of the application does not match the updated features of the 'operating system 2.1', the request to access is not allowed through the 'container 1' 430 and the request is blocked at the 'container 1' 430 at runtime.

In one embodiment, the applications such as 'application 1' 405, 'application 3' 415 and 'application N' 420 can be updated or upgraded to newer versions with additional features. For example, if 'application 1' 405 is updated to a new version such as 'application 1.1', the new version 'application 1.1' is downloaded and executed within the 'container 1' 430. The 'container 1' 430 intercepts the request received from the 'application 1.1', and compares the set of features of the 'application 1.1' with the features corresponding to the 'operating system 1' 460. When the set of features of the 'application 1.1' matches the features of the 'operating system 1' 460, the request to access is allowed through the 'container 1' 430 to the 'operating system 1' 460 at runtime. When the set of features of the 'application 1.1' does not match the features of the 'operating system 1' 460, the request to access is not allowed through the 'container 1' 430 and the request is blocked at the 'container 1' 430 at runtime.

Figure 5:
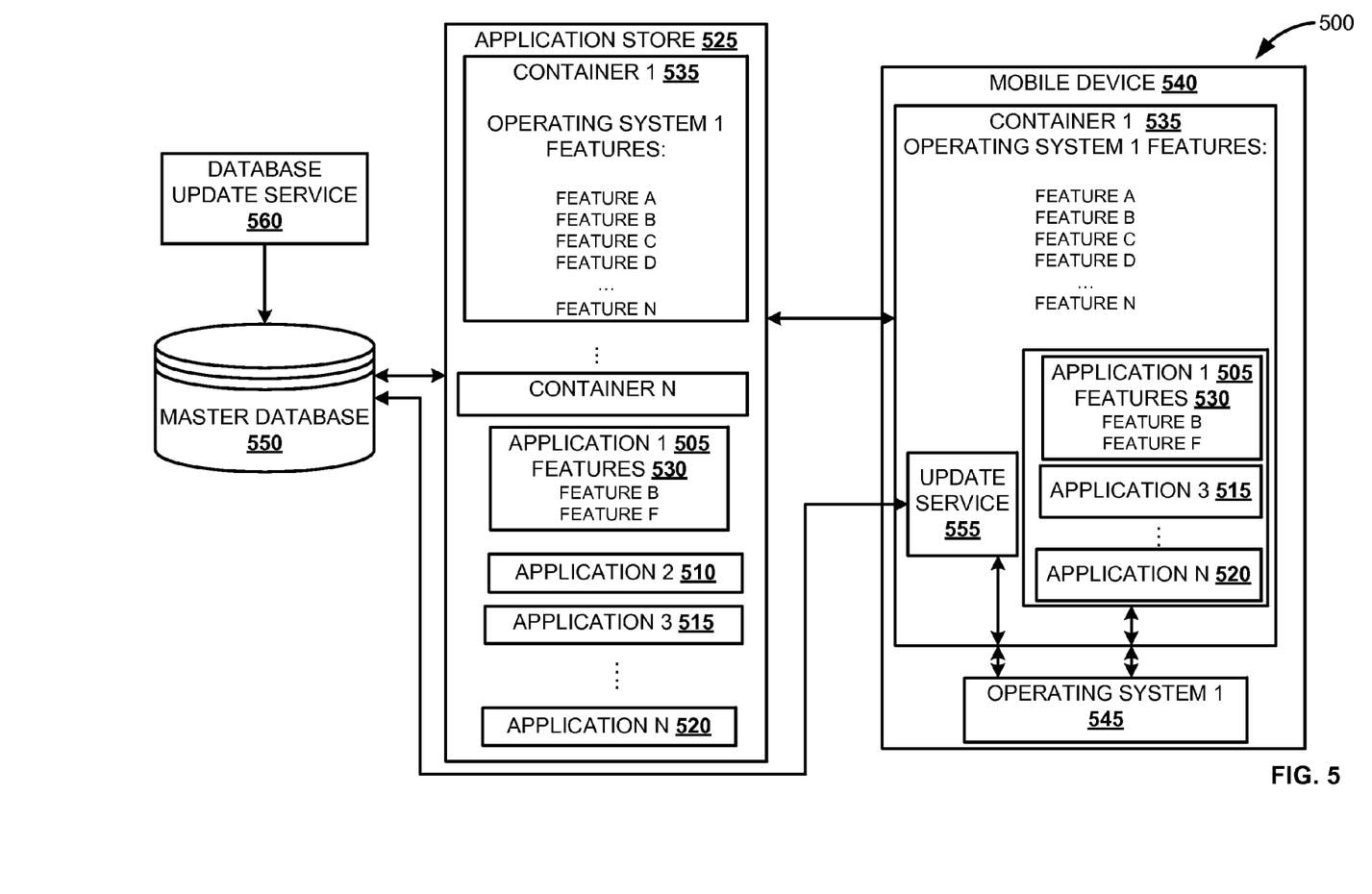
FIG. 5 is a block diagram illustrating an example in a runtime environment for federated service to dynamically switch features in applications, according to one embodiment.

FIG. 5 is a block diagram illustrating an example in runtime environment 500 for federated service to dynamically switch features in applications, according to one embodiment. Consider a scenario where a number of applications such as 'application 1' 505, 'application 2' 510, 'application 3' 515, 'application N' 520 are deployed in application store 525. 'Application 1' 505 includes features 530 such as 'feature B' and 'feature F'. The application store 525 also includes containers such as 'container 1' 535, 'container N', etc., that provides a runtime execution environment for the applications to be executed on mobile device 540. When a request is received from mobile device 540 to download 'application 1' 505, 'application 3' 515 and 'application N' 520 from the application store 525, the application store 525 determines that 'container 1' 535 is supported by 'operating system 1' 545. The 'container 1' 535 retrieves 'operating system 1' features such as 'feature A', 'feature B', 'feature C', 'feature D' and 'feature N' from the master database 550. In response to the request received from the mobile device 540, the 'container 1' 535 along with 'operating system 1' features such as 'feature A', 'feature B', 'feature C', 'feature D' and 'feature N', and 'application 1' 505, 'application 3' 515 and 'application N' 520 are downloaded from the application store 525 to the mobile device 540.

For example, when a request is received from 'application 1' 505 in the form of an application programming interface (API) call to access 'feature B' in the 'operating system 1' 545, the 'container 1' 535 intercepts the received API call and compares 'feature B' of 'application 1' 505 with the features corresponding to 'operating system 1' such as 'feature A', 'feature B', 'feature C', 'feature D' and 'feature N' in the 'container 1' 535. The 'feature B' of 'application 1' 505 matches the 'feature B' associated with the 'operating system 1' 545, and the API call is allowed through the 'container 1' 535 to the 'operating system 1' 545 at runtime. When a request is received from 'application 1' 505 in the form of an API call to access 'feature F' associated with the 'operating system 1' 545, 'feature F' of 'application 1' 505 is compared with the features of the 'operating system 1' 545 in the 'container 1' 535. The 'feature F' of 'application 1' 505 does not match the features of the 'operating system 1' 545, and the API call is blocked at the 'container 1' 535 at runtime. In one embodiment, the database update service 560 receives updates of operating systems and updates the master database 550. The update service 555 requests the master database 550 to receive updates of operating systems to the 'container 1' 535 as explained in detail with reference to FIG. 4.

Figure 6:
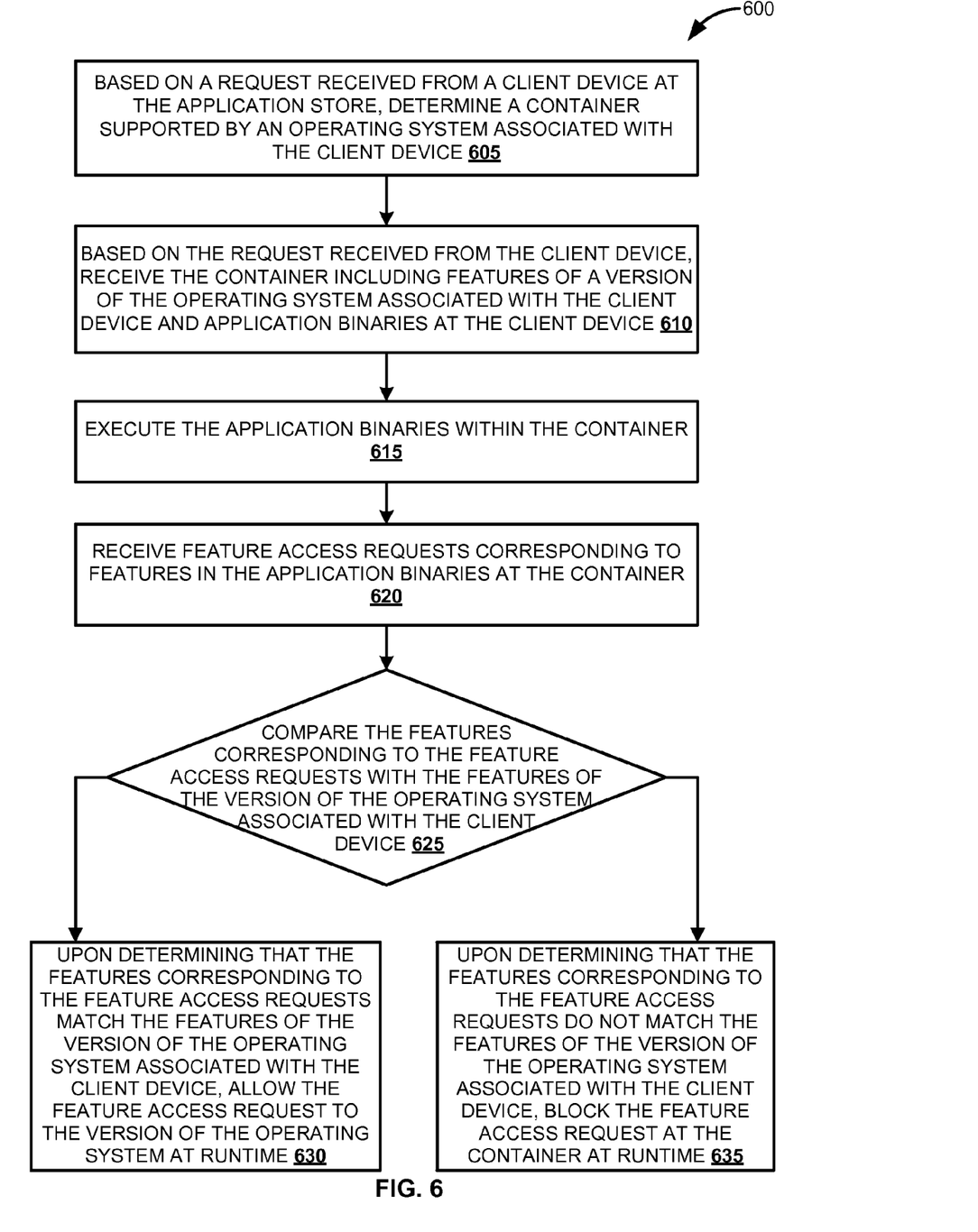
FIG. 6 is a flow diagram illustrating a process of federated service to dynamically switch features in applications at runtime, according to one embodiment.

FIG. 6 is a flow diagram illustrating process of federated service to dynamically switch features in applications at runtime, according to one embodiment. A request from a client device is received at an application store. Based on the request received from the client device at the application store, at 605, a container supported by an operating system associated with the client device is determined. Based on the request received from the client device, at 610, the container including features of a version of the operating system associated with the client device and application binaries are received at the client device. At 615, the application binaries are executed within the container. At 620, feature access requests may be generated from the application binaries. The feature access requests correspond to features of the application binaries. The generated feature access requests are received at the container in the client device. At 625, the features corresponding to the feature access requests are compared with the features of the version of the operating system associated with the client device. Upon determining that the requested features corresponding to the feature access requests match the features of the version of the operating system associated with the client device, at 630, the feature access requests are allowed to the version of the operating system at runtime. Upon determining that the requested features corresponding to the feature access requests do not match the features of the version of the operating system associated with the client device, at 635, the feature access requests are blocked at the container at runtime.

In one embodiment, federated services to dynamically switch features in applications in a combination of deploy time and run time is explained below. Consider a scenario where a 'game application' binary is to be deployed corresponding to various versions of operating systems such as 'android 1.5', 'android 2.3' and 'android 4.0' in an application store. 'Game application' supports features such as 'gyroscope sensor', 'ambient light sensor', etc. The operating system 'android 2.3' supports features such as 'gyroscope sensor', 'accessing multiple cameras', etc., 'android 4.0' supports features such as 'gyroscope sensor', 'Wi-Fi P2P', etc. The 'game application' binary is received at an intermediate federated service layer prior to deployment at the application store. At the intermediate federated service layer, multiple copies of the 'game application' binaries are generated concurrently. While 'code scan service' scans or parses the program code in a first copy of the application binary, the 'switch features service' identifies that the feature in the first copy of 'game application' binary such as 'ambient light sensor' does not match with the features 'gyroscope sensor' and 'Wi-Fi P2P' of the 'android 4.0' operating system, and switch flags are set to 'OFF' at the start of portions of program code in the first copy of 'game application' binary. The first copy of game application binary is packaged and re-generated as a 'first custom game application binary' and is deployed in the application store corresponding to 'android 4.0' operating system.

The application store also includes a container supported by Android operating system to provide a runtime execution environment for the 'game application'. A request is received from a mobile device to download 'first custom game application' binary from the application store. Based on the request received from the mobile application, the application store determines the container supported by the Android® operating system executing in the mobile device. The container in the application store retrieves features of 'android 1.5' operating system such as 'auto-pairing', 'live folders', etc., from the master database. In response to the received request from the mobile device, the container with the features 'auto-pairing', 'live folders' of operating system 'android 1.5' along with 'first custom game application' binary is downloaded to the mobile device from the application store. When an API function call to access 'gyroscope sensor' is received from the 'first custom game application' binary executing in the container in the mobile device, the container intercepts the received API call and matches feature 'gyroscope sensor' of the 'first custom game application' binary with the features 'auto-pairing', 'live folders' of operating system 'android 1.5'. The feature 'gyroscope sensor' of the 'first custom game application' does not match with the features of 'android 1.5' operating system, and accordingly the API function call to access 'gyroscope sensor' is blocked at the container.

The various embodiments described above have a number of advantages. With the federated services to dynamically switch features in applications in both deployment time and runtime, applications can be developed to be compatible with one version of operating system, and during deploy time and/or runtime implementations described above the applications can be made compatible with any version of operating system automatically without additional effort or human intervention. There is no additional development effort required by application developers to develop separate applications compatible with individual versions of operating systems. The federated services to dynamically switch features in applications are compatible with different platforms or versions of operating systems.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits (ASICs), programmable logic devices (PLDs) and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 7:
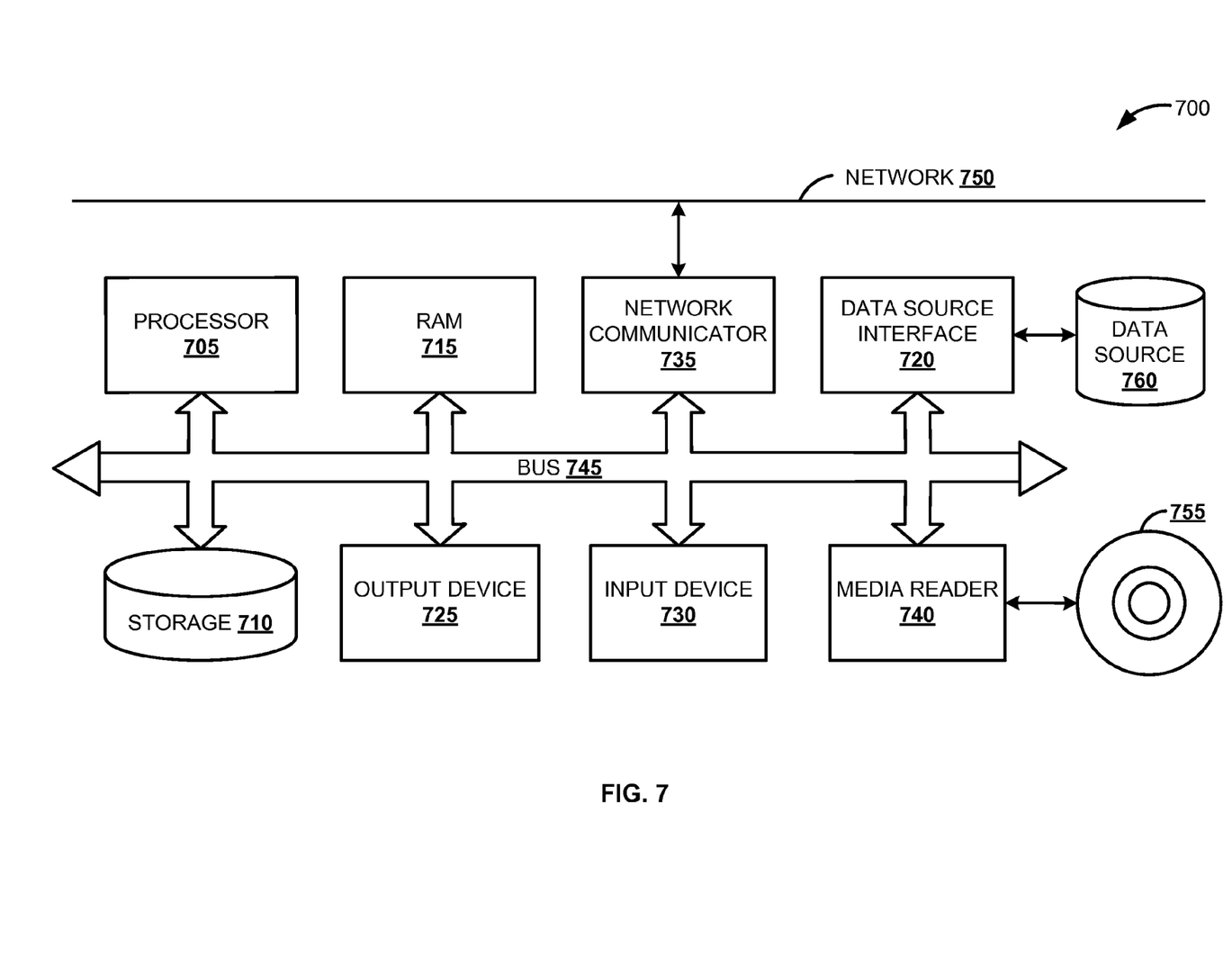
FIG. 7 is a block diagram illustrating an exemplary computer system, according to one embodiment.

FIG. 7 is a block diagram illustrating an exemplary computer system, according to one embodiment. The computer system 700 includes a processor 705 that executes software instructions or code stored on a computer readable storage medium 755 to perform the above-illustrated methods. The computer system 700 includes a media reader 740 to read the instructions from the computer readable storage medium 755 and store the instructions in storage 710 or in random access memory (RAM) 715. The storage 710 provides a large space for keeping static data where at least some instructions could be stored for later execution. The stored instructions may be further compiled to generate other representations of the instructions and dynamically stored in the RAM 715. The processor 705 reads instructions from the RAM 715 and performs actions as instructed. According to one embodiment, the computer system 700 further includes an output device 725 (e.g., a display) to provide at least some of the results of the execution as output including, but not limited to, visual information to users and an input device 730 to provide a user or another device with means for entering data and/or otherwise interact with the computer system 700. The output devices 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 can be accessed via one or more abstraction layers implemented in hardware or software. For example, the data source 760 may be accessed by network 750. In some embodiments the data source 760 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A non-transitory computer-readable medium storing instructions, which when executed by a computer, cause the computer to perform operations comprising:

receiving an application binary at an intermediate federated service layer;

at the intermediate federated service layer:

based on the received application binary, concurrently generating one or more copies of the received application binary corresponding to one or more versions of operating systems;

concurrently parsing program code of the one or more copies of the received application binary;

comparing one or more features associated with the one or more copies of the received application binary with one or more features corresponding to the one or more versions of the operating systems;

based on results of the comparison, enabling or disabling the one or more features associated with the one or more copies of the received application binary; and dynamically re-generating one or more custom application binaries corresponding to the one or more copies of the received application binary; and automatically deploying the dynamically re-generated one or more custom application binaries to the one or more versions of the operating systems in an application store.

2. The non-transitory computer-readable medium of claim 1, further storing instructions, which when executed by the computer, further cause the computer to perform operations comprising:

upon determining that the one or more features associated with the one or more copies of the received application binary do not match the one or more features corresponding to the one or more versions of the operating systems, setting switch flags to OFF corresponding to the one or more features associated with the one or more copies of the received application binary to disable the one or more features associated with the one or more copies of the received application binary.

3. The non-transitory computer-readable medium of claim 1, further storing instructions, which when executed by the computer, further cause the computer to perform operations comprising:

upon determining that the one or more features associated with the one or more copies of the received application binary match the one or more features corresponding to the one or more versions of the operating systems, parsing the program code of the one or more copies of the received application binary to identify one or more portions of the program code of the one or more copies of the received application binary that match the one or more features corresponding to the one or more versions of the operating systems; and setting switch flags to ON at start of the one or more portions of the program code of the one or more copies of the received application binary by code injection, wherein ON indicates enabling the one or more portions of the program code of the one or more copies of the received application binary.

4. The non-transitory computer-readable medium of claim 1, further storing instructions, which when executed by the computer, further cause the computer to perform operations comprising:

receiving the dynamically re-generated one or more custom application binaries at a client device from the application store.

5. The non-transitory computer-readable medium of claim 4, further storing instructions, which when executed by the computer, further cause the computer to perform operations comprising:

determining a container supported by a version of an operating system associated with the client device.

6. The non-transitory computer-readable medium of claim 5, further storing instructions, which when executed by the computer, further cause the computer to perform operations comprising:

executing the dynamically re-generated one or more custom application binaries in the container downloaded from the application store at the client device, wherein the container includes one or more features of the version of the operating system associated with the client device;

generating one or more feature access requests corresponding to one or more features of the dynamically re-generated one or more custom application binaries;

receiving the one or more feature access requests at the container;

comparing the one or more feature access requests corresponding to the one or more features of the dynamically re-generated one or more custom application binaries with the one or more features of the version of the operating system associated with the client device at the container;

upon determining that the one or more feature access requests corresponding to the one or more features of the dynamically re-generated one or more custom application binaries match the one or more features of the version of the operating system associated with the client device, allowing the one or more feature access requests to the version of the operating system associated with the client device at runtime; and upon determining that the one or more feature access requests corresponding to the one or more features of the dynamically re-generated one or more custom application binaries do not match the one or more features of the version of the operating system associated with the client device, blocking the one or more feature access requests at the container at runtime.

7. The non-transitory computer-readable medium of claim 6, further storing instructions, which when executed by the computer, further cause the computer to perform operations comprising:

in response to an update of the version of the operating system associated with the client device, receiving an update of the one or more features of the version of the operating system associated with the client device from a master database to the container.

8. A computer-implemented method for federated services to dynamically switch features in applications, the computer-implemented method comprising:

receiving an application binary at an intermediate federated service layer;

at the intermediate federated service layer:

based on the received application binary, concurrently generating one or more copies of the received application binary corresponding to one or more versions of operating systems;

concurrently parsing program code of the one or more copies of the received application binary;

comparing one or more features associated with the one or more copies of the received application binary with one or more features corresponding to the one or more versions of the operating systems;

based on results of the comparison, enabling or disabling the one or more features associated with the one or more copies of the received application binary; and dynamically re-generating one or more custom application binaries corresponding to the one or more copies of the received application binary; and
automatically deploying the dynamically re-generated one or more custom application binaries to the one or more versions of the operating systems in an application store.

9. The computer-implemented method of claim 8, further comprising:
upon determining that the one or more features associated with the one or more copies of the received application binary do not match the one or more features corresponding to the one or more versions of the operating systems, setting switch flags to OFF corresponding to the one or more features associated with the one or more copies of the received application binary to disable the one or more features associated with the one or more copies of the received application binary.

10. The computer-implemented method of claim 8, further comprising:
upon determining that the one or more features associated with the one or more copies of the received application binary match the one or more features corresponding to the one or more versions of the operating systems, parsing the program code of the one or more copies of the received application binary to identify one or more portions of the program code of the one or more copies of the received application binary that match the one or more features corresponding to the one or more versions of the operating systems; and
setting switch flags to ON at start of the one or more portions of the program code of the one or more copies of the received application binary by code injection, wherein ON indicates enabling the one or more portions of the program code of the one or more copies of the received application binary.

11. The computer-implemented method of claim 8, further comprising:
receiving the dynamically re-generated one or more custom application binaries at a client device from the application store.

12. The computer-implemented method of claim 11, further comprising:
determining a container supported by a version of an operating system associated with the client device.

13. The computer-implemented method of claim 12, further comprising:
executing the dynamically re-generated one or more custom application binaries in the container downloaded from the application store at the client device, wherein the container includes one or more features of the version of the operating system associated with the client device;
generating one or more feature access requests corresponding to one or more features of the dynamically re-generated one or more custom application binaries;
receiving the one or more feature access requests at the container;
comparing the one or more feature access requests corresponding to the one or more features of the dynamically re-generated one or more custom application binaries with the one or more features of the version of the operating system associated with the client device at the container;
upon determining that the one or more feature access requests corresponding to the one or more features of the dynamically re-generated one or more custom application binaries match the one or more features of the version of the operating system associated with the client device, allowing the one or more feature access requests to the version of the operating system associated with the client device at runtime; and
upon determining that the one or more feature access requests corresponding to the one or more features of the dynamically re-generated one or more custom application binaries do not match the one or more features of the version of the operating system associated with the client device, blocking the one or more feature access requests at the container at runtime.

14. The computer-implemented method of claim 13, further comprising:
in response to an update of the version of the operating system associated with the client device, receiving an update of the one or more features of the version of the operating system associated with the client device from a master database to the container.

15. A computer system for federated services to dynamically switch features in applications, the computer system comprising:
a processor; and
a memory coupled to the processor, wherein the memory stores instructions, which when executed by the processor, cause the processor to perform operations comprising:
receiving an application binary at an intermediate federated service layer;
at the intermediate federated service layer:
based on the received application binary, concurrently generating one or more copies of the received application binary corresponding to one or more versions of operating systems;
concurrently parsing program code of the one or more copies of the received application binary;
comparing one or more features associated with the one or more copies of the received application binary with one or more features corresponding to the one or more versions of the operating systems;
based on results of the comparison, enabling or disabling the one or more features associated with the one or more copies of the received application binary; and
dynamically re-generating one or more custom application binaries corresponding to the one or more copies of the received application binary; and
automatically deploying the dynamically re-generated one or more custom application binaries to the one or more versions of the operating systems in an application store.

16. The computer system of claim 15, further storing instructions, which when executed by the processor, further cause the processor to perform operations comprising:
upon determining that the one or more features associated with the one or more copies of the received application binary do not match the one or more features corresponding to the one or more versions of the operating systems, setting switch flags to OFF corresponding to the one or more features associated with the one or more copies of the received application binary to disable the one or more features associated with the one or more copies of the received application binary.

17. The computer system of claim 15, further storing instructions, which when executed by the processor, further cause the processor to perform operations comprising:
upon determining that the one or more features associated with the one or more copies of the received application binary match the one or more features corresponding to the one or more versions of the operating systems, parsing the program code of the one or more copies of the received application binary to identify one or more portions of the program code of the one or more copies of the received application binary that match the one or more features corresponding to the one or more versions of the operating systems; and setting switch flags to ON at start of the one or more portions of the program code of the one or more copies of the received application binary by code injection, wherein ON indicates enabling the one or more portions of the program code of the one or more copies of the received application binary.

18. The computer system of claim 15, further storing instructions, which when executed by the processor, further cause the processor to perform operations comprising:

receiving the dynamically re-generated one or more custom application binaries at a client device from the application store; and determining a container supported by a version of an operating system associated with the client device.

19. The computer system of claim 18, further storing instructions, which when executed by the processor, further cause the processor to perform operations comprising:

executing the dynamically re-generated one or more custom application binaries in the container downloaded from the application store at the client device, wherein the container includes one or more features of the version of the operating system associated with the client device;

generating one or more feature access requests corresponding to one or more features of the dynamically re-generated one or more custom application binaries;

receiving the one or more feature access requests at the container;

comparing the one or more feature access requests corresponding to the one or more features of the dynamically re-generated one or more custom application binaries with the one or more features of the version of the operating system associated with the client device at the container;

upon determining that the one or more feature access requests corresponding to the one or more features of the dynamically re-generated one or more custom application binaries match the one or more features of the version of the operating system associated with the client device, allowing the one or more feature access requests to the version of the operating system associated with the client device at runtime; and upon determining that the one or more feature access requests corresponding to the one or more features of the dynamically re-generated one or more custom application binaries do not match the one or more features of the version of the operating system associated with the client device, blocking the one or more feature access requests at the container at runtime.

20. The computer system of claim 19, further storing instructions, which when executed by the processor, further cause the processor to perform operations comprising:

in response to an update of the version of the operating system associated with the client device, receiving an update of the one or more features of the version of the operating system associated with the client device from a master database to the container.

21. A computer-implemented method for federated services to dynamically switch features in applications, the computer-implemented method comprising:

executing dynamically re-generated one or more custom application binaries in a container downloaded from an application store at a client device, wherein the container includes one or more features of a version of an operating system associated with the client device;

generating one or more feature access requests corresponding to one or more features of the dynamically re-generated one or more custom application binaries;

receiving the one or more feature access requests at the container;

comparing the one or more feature access requests corresponding to the one or more features of the dynamically re-generated one or more custom application binaries with the one or more features of the version of the operating system associated with the client device at the container;

upon determining that the one or more feature access requests corresponding to the one or more features of the dynamically re-generated one or more custom application binaries match the one or more features of the version of the operating system associated with the client device, allowing the one or more feature access requests to the version of the operating system associated with the client device at runtime; and upon determining that the one or more feature access requests corresponding to the one or more features of the dynamically re-generated one or more custom application binaries do not match the one or more features of the version of the operating system associated with the client device, blocking the one or more feature access requests at the container at runtime.

22. The computer-implemented method of claim 21, further comprising:

in response to an update of the version of the operating system associated with the client device, receiving an update of the one or more features of the version of the operating system associated with the client device from a master database to the container.

23. The computer-implemented method of claim 22, further comprising:

generating one or more feature access requests corresponding to one or more features of the dynamically re-generated one or more custom application binaries;

receiving the one or more feature access requests at the container;

comparing the one or more feature access requests corresponding to the one or more features of the dynamically re-generated one or more custom application binaries with the update of the one or more features of the version of the operating system associated with the client device at the container;

upon determining that the one or more feature access requests corresponding to the one or more features of the dynamically re-generated one or more custom application binaries match the update of the one or more features of the version of the operating system associated with the client device, allowing the one or more feature access requests to the version of the operating system associated with the client device at runtime; and upon determining that the one or more feature access requests corresponding to the one or more features of the dynamically re-generated one or more custom application binaries do not match the update of the one or more features of the version of the operating system associated with the client device, blocking the one or more feature access requests at the container at runtime.

* * * * *